United States Patent [19]
Price

[11] Patent Number: 6,024,049
[45] Date of Patent: Feb. 15, 2000

[54] SELECTIVE ACCESS BIRDFEEDER

[76] Inventor: Peter E. Price, 20 Johnson Rd., Andover, Mass. 01810

[21] Appl. No.: 09/177,279

[22] Filed: Oct. 22, 1998

[51] Int. Cl.⁷ ................................................. A01K 39/01
[52] U.S. Cl. .......................................... 119/57.9; 119/52.2
[58] Field of Search .................. 119/52.2, 52.3, 119/57.8, 57.9

[56] References Cited

U.S. PATENT DOCUMENTS

| | | | |
|---|---|---|---|
| 4,259,927 | 4/1981 | Clarke | 119/52.3 |
| 4,767,088 | 8/1988 | Fielder et al. | 119/57.9 |
| 5,062,388 | 11/1991 | Kilham | 119/52.2 |
| 5,215,039 | 6/1993 | Berscherer | 119/52.2 |
| 5,309,865 | 5/1994 | Hardison | 119/57.8 |

FOREIGN PATENT DOCUMENTS 2275408  8/1994  United Kingdom ................. 119/57.9

*Primary Examiner*—Peter M. Poon
*Assistant Examiner*—Elizabeth Shaw
*Attorney, Agent, or Firm*—Bromberg & Sunstein LLP

[57] ABSTRACT

A birdfeeder, in an embodiment, affords selective access to its contents. The embodiment includes an enclosure for storing food, a port disposed in the sidewall of the enclosure, and a conduit disposed in the port. The conduit provides communication between the contents of the birdfeeder through the port to an external location where birds may perch and feed. Both hanging and posted feeders as well as methods of selectively feeding birds are provided in a number of embodiments.

25 Claims, 5 Drawing Sheets

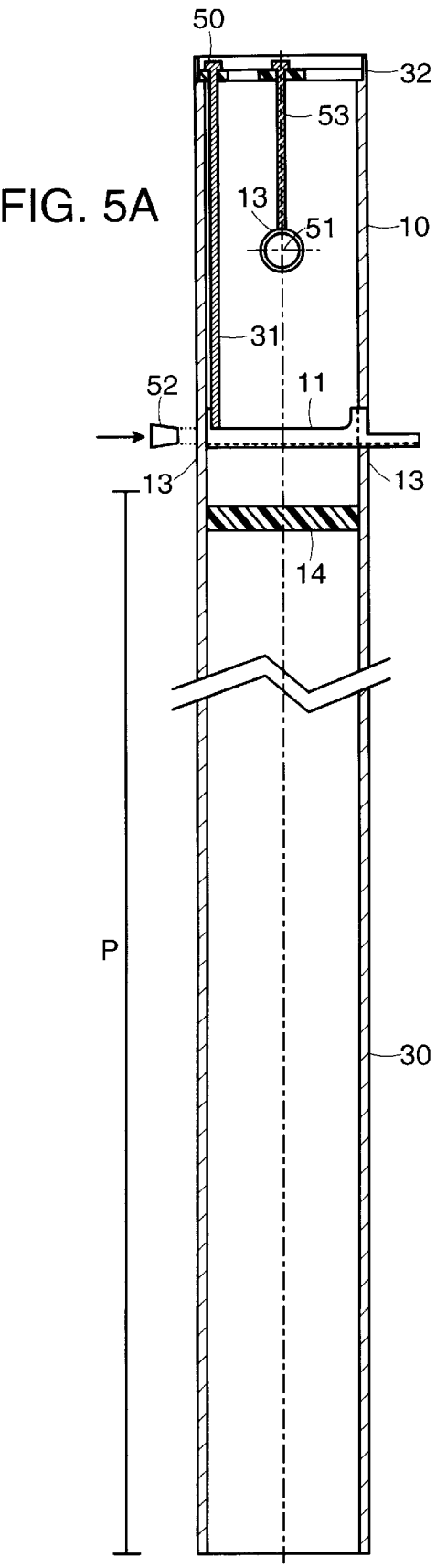
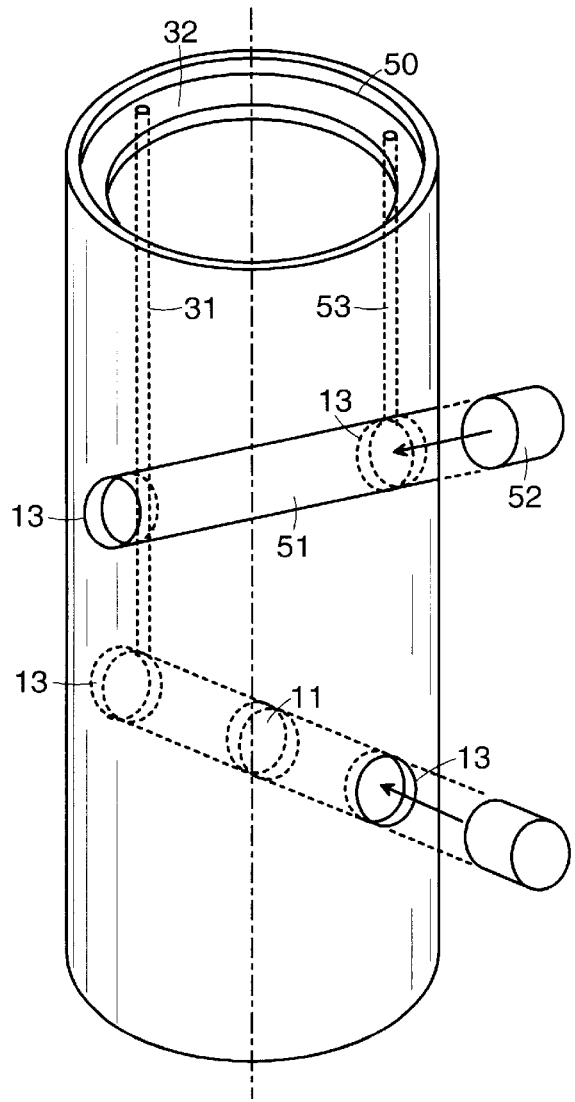
FIG. 5A
FIG. 5B

SELECTIVE ACCESS BIRDFEEDER

TECHNICAL FIELD

The present invention relates to the design of a birdfeeder to provide selective access to its contents while denying access to and resisting damage caused by intruders, most notably, squirrels.

BACKGROUND ART

Despite the efforts of many over numerous years, an economical, practical birdfeeder design impervious to attack by unwanted, ingenious animals seeking nourishment has remained illusive. Patented as well as unpatented designs utilizing springs, counterbalances, shields, and gratings have been found lacking in one or more ways. Other practical considerations include the ease of filling and cleaning the feeder, maintenance of uncontaminated feed in all climates and conditions, and general esthetic concerns.

SUMMARY OF THE INVENTION

In a first embodiment of the invention, a birdfeeder, affording selective access to its contents, is provided. The birdfeeder includes an enclosure, having a sidewall, a bottom end, an interior, and an exterior, and a port disposed in the sidewall. The birdfeeder also includes a conduit disposed in the at least one port to afford communication from the interior through the at least one port. The conduit has a first end extending beyond the sidewall to a location external to the enclosure. In another embodiment, the exterior has a grip-resistant surface.

In addition, the enclosure may be configured so that a distance along the sidewall from the bottom to the port exceeds the average maximum vertical leaping distance of an adult squirrel. The enclosure may be configured so that a distance along the sidewall from a top of the enclosure to a port exceeds the average maximum reaching distance of a fully extended adult squirrel. In a further embodiment, a space between the location and the sidewall is less than the average minimum perching space taken by an adult squirrel. In a preferred embodiment, the enclosure is made from a smooth plastic pipe which is free from protrusions graspable by an average adult squirrel. The smooth plastic may be optically transparent to allow viewing of the contents of the birdfeeder. In accordance with yet another embodiment, the circumference of the exterior exceeds twice the average maximum grasping distance of an adult squirrel.

The birdfeeder, in another embodiment of the invention, includes a tubular enclosure, a plurality of ports with at least one pair of ports disposed in diametric opposition and axially equidistant from the bottom end of the enclosure, and at least one conduit having its ends disposed in the pair of ports, providing communication from the interior through at least one of the pair. One end of the conduit extends through a port beyond the sidewall to a location external to the enclosure. The diameter of each port may, in a preferred embodiment, be sufficiently large to facilitate a spillage amount of the contents to escape the enclosure through the port.

A method for selectively feeding birds, in accordance with another embodiment of the invention, including the steps of providing a birdfeeder having a tubular enclosure, ports disposed in the sidewall of the enclosure with at least one pair of ports disposed in diametric opposition and axially equidistant from the bottom end of the enclosure, a hanger, and at least one conduit, its ends disposed in the ports providing communication from the interior through a port, the conduit having a first end extending through the at least one port beyond the sidewall to a location, the location external to the enclosure, filling the enclosure with food, and hanging or posting the birdfeeder.

BRIEF DESCRIPTION OF THE DRAWINGS

FIG. 5A is a cross-sectional view of a selective access birdfeeder suited for posting according to a preferred embodiment of the invention.

FIG. 5B is a side view of the enclosure portion according to the embodiment of the invention depicted in FIG. 5A.

DETAILED DESCRIPTION OF SPECIFIC EMBODIMENTS

Figures 1, 2:
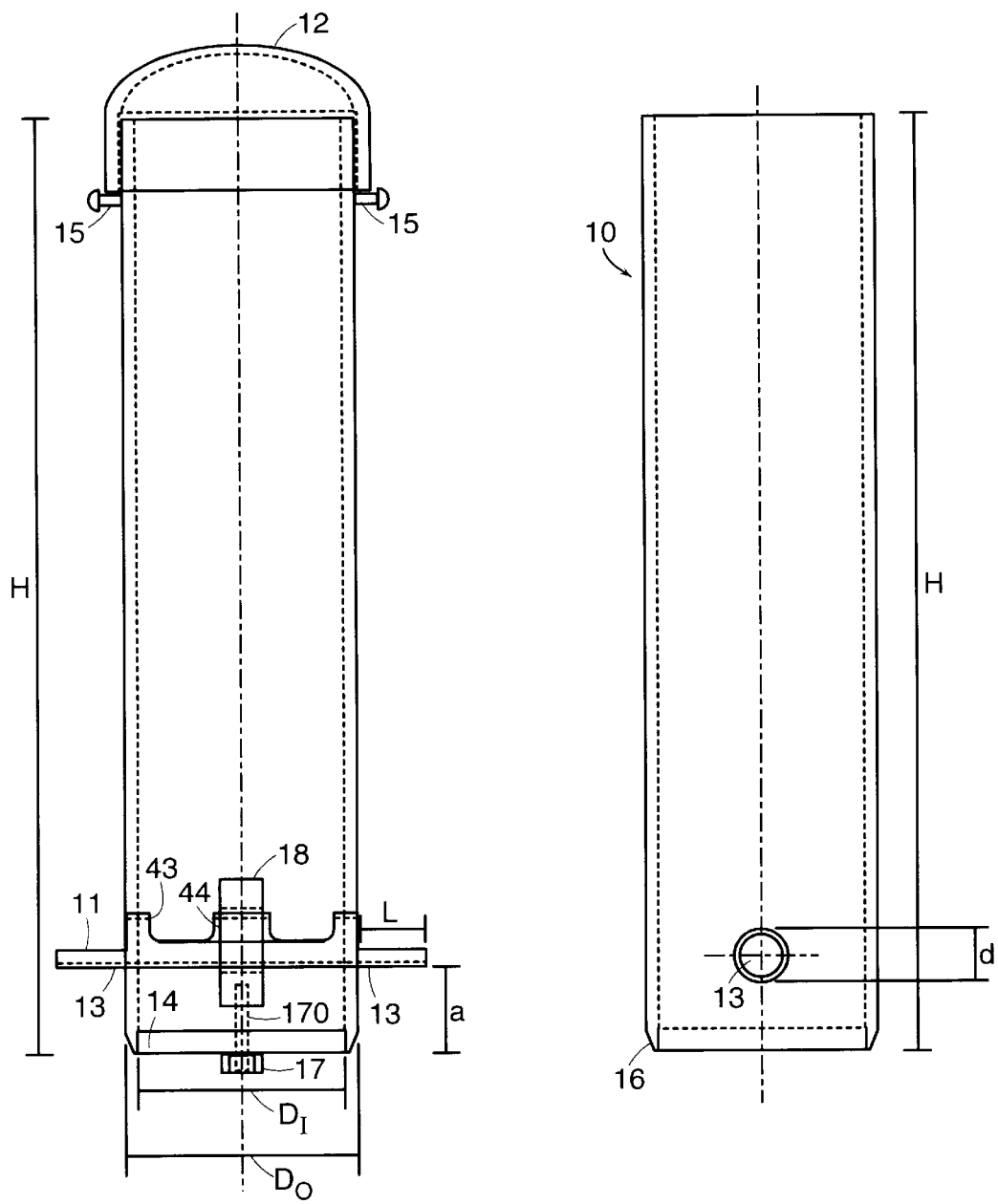
FIG. 1 is a cross-sectional view of a selective access birdfeeder suited for hanging according to an embodiment of the invention.
FIG. 2 is a longitudinal view of an enclosure according to an embodiment of the invention.

Various embodiments of the selective access birdfeeder are designed to provide nourishment to birds while denying it to other intruding wildlife. In particular, squirrels are notorious for their ingenuity in defeating efforts to thwart their access to food stores. The design of the birdfeeder, the construction material selected, and the immediate physical surroundings of the feeder are important factors in thwarting intruding squirrels. In particular, the immediate physical surroundings should not include natural (e.g. shrubbery) or man-made structures (house or barn) to provide support for intruders in their quest for food.

The exterior of the chosen construction material should be hard and smooth. Polyvinyl chloride (PVC) plastic has been found to be a suitable material. The material may be optically transparent for viewing birdfeeder contents from the exterior. It should not yield to gripping or clawing of an animal facilitating defined, unintended pathways to the birdfeeder contents. The material should not degrade after long term exposure to weather. There should be no edges or protrusions upon which an animal may traverse. Squirrels may leap from the ground to a feeder. They may climb whatever structure a feeder hangs from and attack the feeder from above. They will shinny down or climb up the length of a feeder or traverse circumferentially if provided a foothold or clawhold.

Ports providing communication between the birdfeeder contents and the exterior should be carefully placed to defeat intruder attacks. Such orifices may be of suitable size to provide direct feeding access for birds and to allow for some escape of feed to the ground for other birds to eat.

Terminology defined here and in the appended claims below include:

"average maximum vertical leaping distance of an adult squirrel"—is a height which a squirrel may attain from a running start limited by the process of the interchange of kinetic energy with gravitational potential energy; this distance is estimated as between 1.5 and 2 meters;

"average maximum reaching distance of a fully extended adult squirrel"—is a distance which a squirrel is capable of hanging, head down, using its rear feet on some attachment point; this distance is approximately 35 to 50 centimeters;

"average minimum perching space taken by an adult squirrel"—is the space needed for a squirrel to perch while feeding;

"average maximum grasping distance of an adult squirrel"—is a distance which a squirrel is capable of grasping with its claws, particularly around the circumference of a tubular birdfeeder; this distance is approximately 12 to 18 centimeters; and "grip resistant surface"—is a macroscopically smooth surface, having no texture, protrusions, crevices or other structure, which would provide a claw grip or a foot pad grip sufficient to support an attacking animal's weight, and of sufficient hardness to be difficult to penetrate with the claws or nails of an attacking animal to an extent sufficient to allow support of the animal's weight.

Figure 4A:
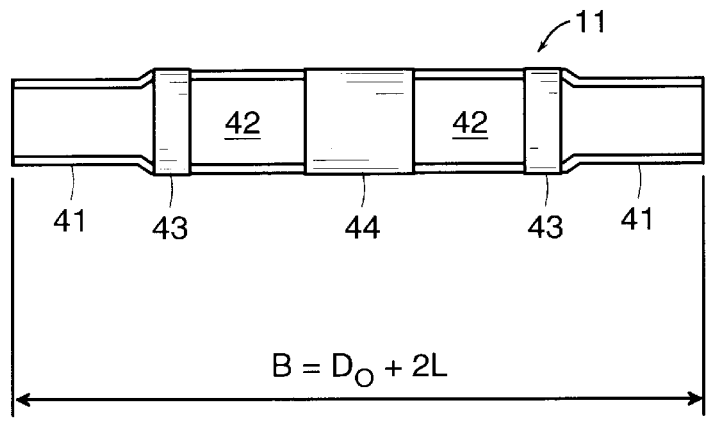
FIGS. 4A and 4B are top and side views of a conduit, in accordance with an embodiment of the invention.
Figure 4B:
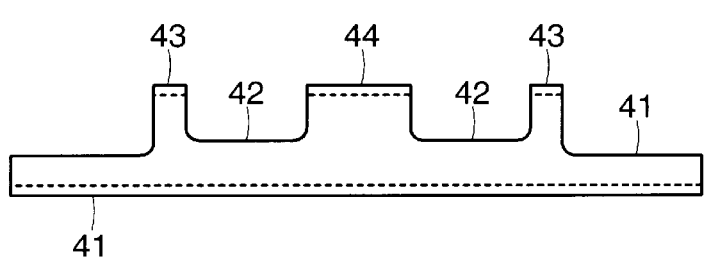
Figure 4C:
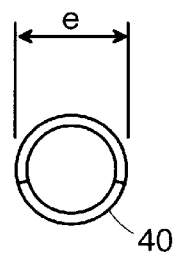
FIG. 4C shows the cross-section of the conduit.

FIG. 1 is a cross-sectional view of a selective access birdfeeder suitable for hanging according to an embodiment of the invention, while FIG. 2 is a longitudinal view of an enclosure for this embodiment. Height, H, of enclosure 10 is determined so that the distance H less the distance, a, (wherein a is the vertical position of a feeding location) is greater than the "average maximum reaching distance of a fully extended adult squirrel" defined above. For all practical purposes, a measures no less than 5 centimeters, and H is at least 55 centimeters. A successful (in thwarting squirrels) working model of a hanging birdfeeder embodiment has a height, H, of between 61 and 66 centimeters. Preferably, a measures between 5 and 10 centimeters. In accordance with the embodiment shown, the outer diameter of the tubular enclosure (the enclosure is not limited to being of cylindrical shape), $D_o$, is designed such that the circumference $\pi D_o$ exceeds twice "the average maximum grasping distance of an adult squirrel" defined above. An outer diameter of at least 10–11.5 centimeters is preferred. Top 12 may easily be placed onto the enclosure 10 after filling the interior of the enclosure with food. Top 12 protects the contents from the environment and potential intruders from above. Undesirable substances may not contaminate the feed with proper birdfeeder usage. Pins 15 are affixed to the sidewall of the enclosure 10 to provide attachment points for a hanger. In the particular embodiment shown, conduit 11 is disposed within two diametrically opposed ports 13, with conduit 11 extending a distance, L, exterior to the sidewall of the enclosure 10 from both ports 13. L measures less than a horizontal distance which would afford the average minimum perching space taken by an adult squirrel for such an intruder if such a squirrel were to try to perch on an external portion of conduit 11. L should be less than about 38 millimeters. Diameter, d, of ports 13, should be large enough for birds to access food but small enough to resist extensive food spillage. The length, L, and the port diameter, d, may be designed to allow some food to fall as birds are perched and feeding from the conduit 11. The amount of such food may be determined by the diameter of ports 13, the length, L, and by the so-called "piling angle" of seed. Given the other preferred dimensions, in accordance with the embodiment of the invention and a piling angle for black sunflower seed, for example, of about 33 degrees, a value of approximately 19 millimeters is preferred for the value of d. Conduit 11 is sized to slide through ports 13. FIG. 4 depicts, in accordance with a preferred embodiment, a conduit 11 designed for use in the hanging birdfeeder of FIG. 1. Conduit 11 is cut from a tube of appropriate diameter e to facilitate stability when disposed in ports 13 of diameter d. Conduit 11 may have approximately half of its wall removed leaving a trough of generally semi-circular cross-section 40 along some or all of its length. FIGS. 4A and 4B show a conduit of length B equivalent to the sum $D_o$ and twice the extension length L. This facilitates two diametrically opposed perching spaces 41 for bird feeding. In another embodiment, a conduit 11 may only afford one perching space on one end. In this configuration, the port 13 in the sidewall of enclosure 10 may be plugged. Care must be taken to provide no graspable area at or near such a "non-feeding" port. Plugging of the second port may be advantageous. Temporary access to both opposing ports is desirable for easy cleaning of the feeder with a rod or dowel. The use of adhesive to further secure conduit 11 to the sidewall near the "non-feeding" port may also be desirable.

When feed is introduced into the enclosure 10 it fills areas 42 of conduit 11. Feed naturally will flow radially outward to perching spaces 41. Feed also may pass through the remaining enclosure 10 volume to completely fill enclosure 10 from the bottom 14 up to its top, above pins 15. FIGS. 4A and 4B depict a conduit embodiment including two mating "ring" areas 43 at a distance approximately ½ $D_o$ from the lengthwise midpoint of conduit 11. At these areas 43, the original tube is uncut facilitating mating and stability of the conduit 11 when disposed in ports 13. The lateral extent or width of rings 43 may be increased toward the mid point of conduit 11 to adjust the position of the feed pile such that less rather than more spillage occurs from the extension of conduit 11. In addition, a central area 44 is provided to facilitate coupling to an enclosure bottom 14 (FIG. 1). Bottom 14 acts to contain the contents of the birdfeeder. A bevel 16 is shown wherein the sidewall is tapered between $D_o$, and an internal enclosure diameter $D_f$. The sidewall, beveled area 16, and the bottom 14 are to be maintained in a smooth condition as these are potentially protruding, rough, grippable sites facilitating an intruder in defeating the purpose of the birdfeeder. The bottom 14 may be press fit into the enclosure 10 and may be attached to conduit 11 with a threaded rod 170 and nut 17 coupled with a conduit clamping ring 18. The clamping ring 18 is shown to fit around the central area 44 of conduit 11, providing stability of conduit 11. This threaded rod 170, nut 17 and clamping ring 18 arrangement facilitates easy removal of conduit 11 for cleaning and for replacement of conduit 11 with an alternate conduit designed to allow more or less food spillage to ground feeding birds. Other attachment methods well known in the art may be employed.

Figure 3:
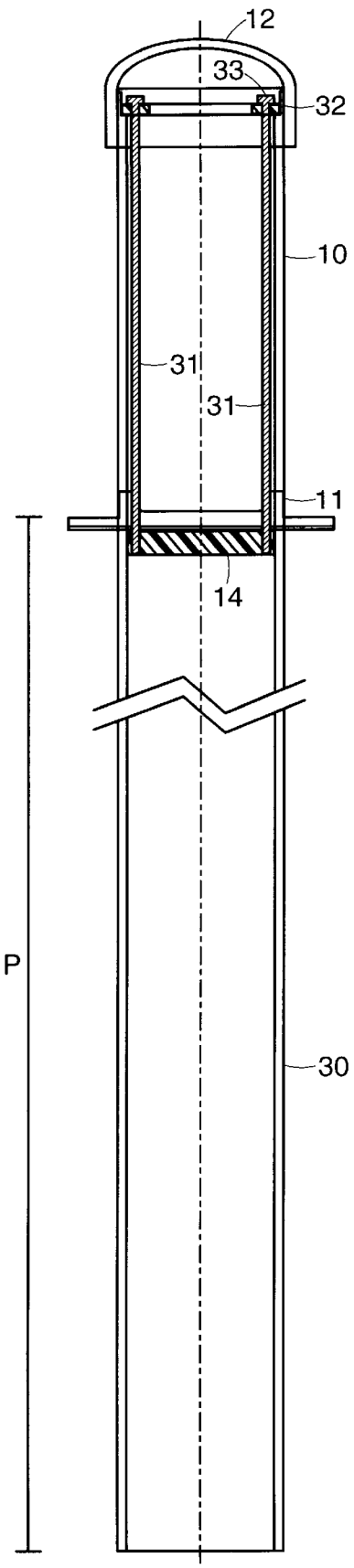
FIG. 3 is a cross-sectional view of a selective access birdfeeder suited for posting according to an embodiment of the invention.

FIG. 3 is a cross-sectional view of a selective access birdfeeder suited for posting according to an embodiment of the invention. A post 30 supports the enclosure 10 with conduit 11 at a distance, P, from the ground or other accessible point for an intruder. P, in a preferred embodiment, exceeds about 1.5 meters, or the "average maximum vertical leaping distance of an adult squirrel" defined above. Bottom 14 is shown supporting conduit 11 and is shown itself supported by support rods 31. Such rods 31 are shown to be disposed within holes of a plate 32 which is held by means of a recess machined into the sidewall of enclosure 10 at its upper end. Nuts 33 may be used on rods 31 if the rods are threaded. Other fastening constructs well known in the art would provide similar structural stability.

FIG. 5A is a cross-sectional view of a preferred embodiment for a birdfeeder suited for posting. Two conduits 11 and 51 are aligned lengthwise orthogonal to one another. In this arrangement, the conduits 11 and 51 are supported by rods 31 and 53, respectively. More clearly shown in the side view of FIG. 5B, rods 31 and 53 are disposed within holes of a plate 32 which is held by means of a recess 50 in the wall of the enclosure 10.

This embodiment illustrates the plugging (with plugs 52) of one end of each conduit (11 and 51) providing a total of 2 feeding areas, each at a different height and circumferential position.

Figure 6:
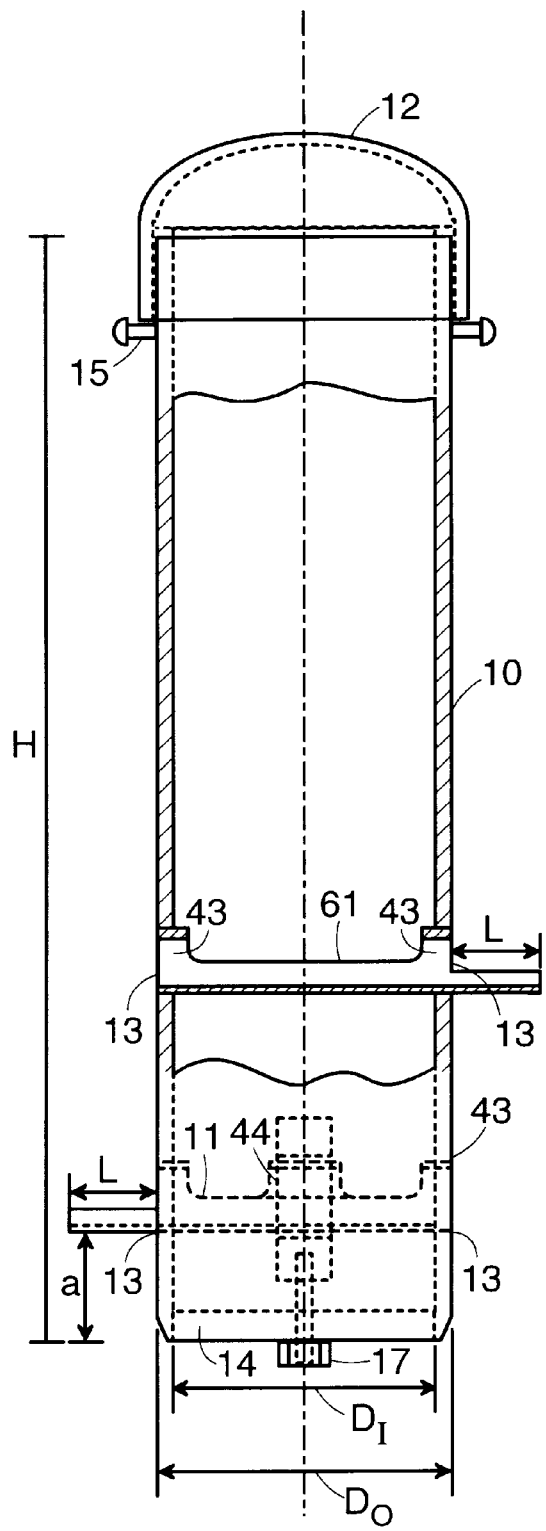
FIG. 6 is a partial cross-sectional view of a selective access birdfeeder suited for hanging according to a preferred embodiment of the invention.

FIG. 6 shows, in a partial cross-section, a preferred embodiment for a hanging birdfeeder. In this configuration, conduits 11 and 61 also provide a total of 2 feeding areas (one for each conduit), the conduits 11 and 61 are aligned lengthwise parallel to each other, with the feeding areas at different heights and in diametric opposition. In this embodiment, conduit 61 may be disposed about 15 centimeters above conduit 11 so long as the defined criteria previously discussed are satisfied. FIG. 6 illustrates conduit 11 to be stabilized by the aforementioned method of FIG. 1; conduit 61 is shown stabilized only by the contact between a mating "ring" areas 43 and the port 13.

Although the invention has been described with reference to several preferred embodiments, it will be understood by one of ordinary skill in the art that various modifications can be made without departing from the spirit and the scope of the invention, as set forth in the claims hereinbelow.

What is claimed is:

1. A birdfeeder, affording selective access to its contents, comprising:
   (a) an enclosure, having a sidewall, a bottom, an interior, and an exterior;
   (b) a port disposed in the sidewall; and
   (c) a conduit having a first end and a length, the conduit disposed in the port providing communication from the interior through the port, the first end disposed at a location external to the enclosure, a sufficient portion of the length extending beyond the sidewall into the interior, so that contents may be conveyed from the interior along the length.

2. A birdfeeder according to claim 1, wherein the exterior has a grip-resistant surface.

3. A birdfeeder according to claim 2, wherein the enclosure is configured so that a distance along the sidewall from the bottom to the port exceeds the average maximum vertical leaping distance of an adult squirrel.

4. A birdfeeder according to claim 3, wherein the enclosure has a top opposite the bottom and the enclosure is configured so that a distance along the sidewall from the top to the port exceeds the average maximum reaching distance of a fully extended adult squirrel.

5. A birdfeeder according to claim 4, wherein a space between the location and the sidewall is less than the average minimum perching space taken by an adult squirrel.

6. A birdfeeder according to claim 5, wherein the sidewall has a circular cross-section and the enclosure is tubular.

7. A birdfeeder according to claim 6, wherein the enclosure is made from a smooth plastic pipe which is free from protrusions graspable by an average adult squirrel.

8. A birdfeeder according to claim 6, wherein the plastic is polyvinyl chloride.

9. A birdfeeder according to claim 7, wherein the plastic pipe is optically transparent.

10. A birdfeeder according to claim 6, wherein the exterior has a circumference, the circumference exceeding about twice the average maximum grasping distance of an adult squirrel.

11. A birdfeeder, affording selective access to its contents, comprising:
    (a) a tubular enclosure having a defined axis of symmetry, a sidewall, a bottom end, an interior, an exterior, and a circumference;
    (b) a plurality of ports disposed in the sidewall, at least one pair of ports disposed in diametric opposition and axially equidistant from the bottom end; and
    (c) at least one conduit having a first end and a second end defining a length therebetween, the ends disposed in the at least one pair of ports providing communication from the interior through at least one port of the at least one pair of ports, the first end disposed at a location external to the enclosure.

12. A birdfeeder according to claim 11, wherein the exterior has a grip-resistant surface.

13. A birdfeeder according to claim 12, wherein the enclosure is configured so that a distance along the sidewall from the bottom to each of the plurality of ports exceeds the average maximum vertical leaping distance of an adult squirrel.

14. A birdfeeder according to claim 13, wherein the enclosure has a top end opposite the bottom end and the enclosure is configured so that an axial distance along the sidewall from the top end to each of the plurality of ports exceeds the average maximum reaching distance of a fully extended adult squirrel.

15. A birdfeeder according to claim 14, wherein a space between the location and the sidewall is less than the average minimum perching space taken by an adult squirrel.

16. A birdfeeder according to claim 15, wherein the circumference exceeds about twice the average maximum grasping distance of an adult squirrel.

17. A birdfeeder according to claim 16, wherein each of the plurality of ports has a port diameter, the port diameter being sufficiently large to facilitate a spillage amount of the contents to escape the enclosure through the port.

18. A birdfeeder according to claim 16, wherein the enclosure is made from a smooth plastic pipe which is free from protrusions graspable by an average adult squirrel.

19. A birdfeeder according to claim 16, wherein the plastic is polyvinyl chloride.

20. A birdfeeder according to claim 18, wherein the plastic pipe is optically transparent.

21. A method for selectively feeding birds comprising:
    providing a birdfeeder, the birdfeeder including:
        a tubular enclosure having a defined axis of symmetry, a sidewall, a bottom end, an interior, an exterior, and a diameter,
        a plurality of ports disposed in the sidewall, at least one pair of ports disposed in diametric opposition and axially equidistant from the bottom end,
        a hanger, and
        at least one conduit having a first end and a second end defining a length therebetween, the ends disposed in the at least one pair of ports providing communication from the interior through at least one port of the at least one pair of ports, the first end disposed at a location external to the enclosure
    filling the enclosure with food, and
    hanging the birdfeeder.

22. A method for selectively feeding birds comprising:
    providing a birdfeeder, the birdfeeder including:
        a tubular enclosure having a defined axis of symmetry, a sidewall, a bottom end, an interior, an exterior, and a diameter, a plurality of ports disposed in the sidewall, at least one pair of ports disposed in diametric opposition and axially equidistant from the bottom end, a post for coupling the bottom end with ground, and at least one conduit having a first end and a second end defining a length therebetween, the ends disposed in the at least one pair of ports providing communication from the interior through at least one port of the at least one pair of ports, the first end disposed at a location external to the enclosure filling the enclosure with food, and posting the birdfeeder.

23. A method according to claim 22, wherein the post is an extension of the tubular enclosure.

24. A method for selectively feeding birds comprising:

providing a birdfeeder, the birdfeeder including:

an enclosure, having a sidewall, a bottom, an interior, and an exterior;

a port disposed in the sidewall;

a hanger, and a conduit having a first end and a length, the conduit disposed in the port providing communication from the interior through the port, the first end disposed at a location external to the enclosure, a sufficient portion of the length extending beyond the sidewall into the interior, so that contents may be conveyed from the interior along the length, filling the enclosure with food, and hanging the birdfeeder.

25. A method for selectively feeding birds comprising:

providing a birdfeeder, the birdfeeder including:

an enclosure, having a sidewall, a bottom, an interior, and an exterior;

a port disposed in the sidewall;

a post for coupling the bottom with ground, and a conduit having a first end and a length, the conduit disposed in the port providing communication from the interior through the port, the first end disposed at a location external to the enclosure, a sufficient portion of the length extending beyond the sidewall into the interior, so that contents may be conveyed from the interior along the length, filling the enclosure with food, and posting the birdfeeder.

* * * * *